Sept. 19, 1939.　　　A. C. OSTERHELD　　　2,173,485
PROTECTOR DEVICE FOR SPOUT VESSELS
Filed April 7, 1938
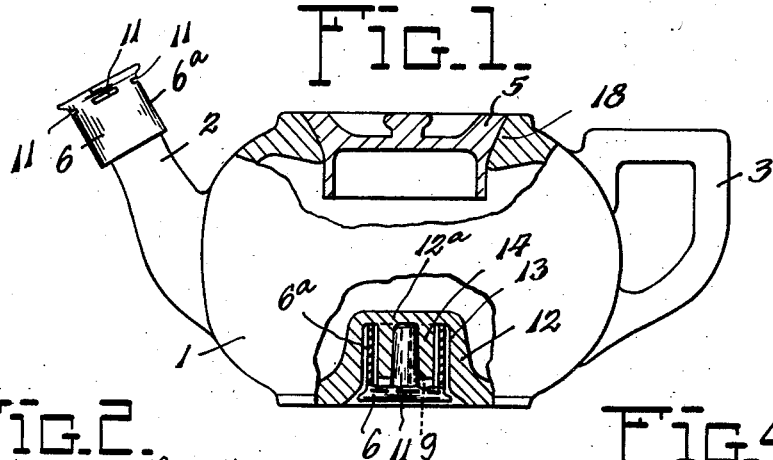
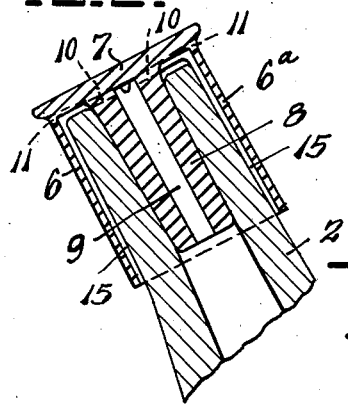
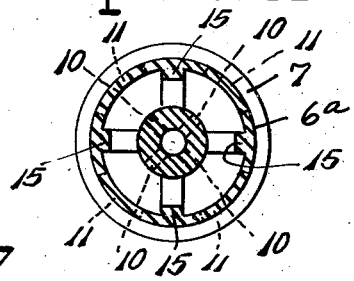
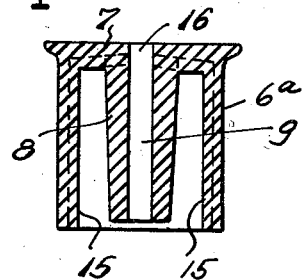
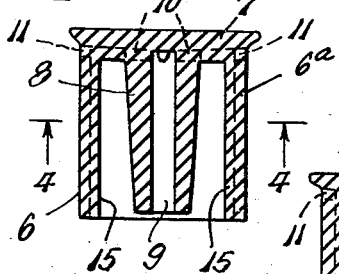
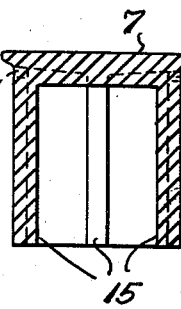
Inventor
ALBERT C. OSTERHELD
By Robb&Robb
ATTORNEYS Patented Sept. 19, 1939

2,173,485

UNITED STATES PATENT OFFICE 2,173,485

PROTECTOR DEVICE FOR SPOUT VESSELS

Albert C. Osterheld, Cleveland, Ohio, assignor to Clark Aco Teapot Company, Cleveland, Ohio, a corporation of Ohio Application April 7, 1938, Serial No. 200,756

8 Claims. (Cl. 53—3)

The present invention embodies a novel form of protector designed for use in connection with vessels such as pots for tea, coffee, hot chocolate, hot water, or the like, for the primary purpose of preventing the chipping of the end of the spout of the pot under conditions of handling.

As is well known, it is customary in restaurants, dining rooms, and the like, to supply to customers, tea, hot chocolate, coffee, hot water, etc., in a pot. I have found by practical experience that approximately the greatest losses which restaurants suffer in the use of these pots arise from the chipping of the ends of the spouts of the pots themselves. In fact, as many as perhaps one hundred pots have to be discarded on account of chipped spouts, as compared with one or two that are thrown away because of breaking of the pot bodies, handles, or other portions of the vessels.

To do away with the losses by chipping above referred to, my invention provides a peculiar form of cap made of rubber or similar substance, and adapted to be fitted over the free end of the spout. This cap or protector is readily attachable and detachable and is applied to the spout of the teapot, and retained thereon during all periods of handling of the pot that give rise to the breakage or chipping of the spout portion.

This chipping is never caused when the pot is placed on the table by the waiter at the service of the customer, and therefore, the protector of the invention is not necessary to be emplaced on the spout at such time. When the waiter is carrying the pot from place to place, after it is filled or emptied, and during the process of washing the pot, the spout chipping is likely to occur, and it is at these times that the protector of my invention is usefully applied to the spout.

A natural problem incident to the use of a protector such as my invention, resides in the desirability of preventing the loss of the caps or protectors when they are detached from the spout and the further desirability of having these protectors available immediately to be placed on the spouts of teapots, etc., as soon as the latter have been emptied at the tables and should be returned to the kitchen for washing.

With this in mind, I have so designed the body of my pot as to provide a receiving pocket or recess in the bottom of the pot into which pocket or recess the cap or protector may be quickly placed, and held in place when it is not applied to the spout. In other words, the protector is adapted to be interchangeably mounted on the spout or arranged so that it is received in said bottom pocket or recess for the purpose above mentioned.

Another problem experienced by restaurant owners in the use of teapots is that arising from the fact that tea has a tendency to stain and oftentimes the stains of the tea accumulate in the mouth or end of the spout. Naturally the foregoing may give the impression to the customer that the teapot is not clean, even though it has been carefully washed and rinsed before the tea is served therein.

With the foregoing in mind, therefore, my protector has been designed pecularily so as to provide a stem-like projection extending from the top portion of the cap or protector interiorly theroef, and adapted to be received in the spout itself when the protector is mounted in position on the extremity of said spout. This projection fits snugly in contact with the inner walls of the spout at its extremity and since my protector is made of rubber, or material of similar nature, upon removal of the protector from the spout the said projection by rubbing contact with the inner walls of the spout will remove any tea stains that might accumulate on such wall, as an incident to the actual detachment of the protector from said spout.

In the construction of the protector of my invention, another provision has been made. This provision deals with the formation of the protector so that while it is efficient to prevent the chipping of the extremity of the spout, it will permit of the passage of water from the spout upon inversion of the pot or vessel, after it has been washed, in both the washing and rinsing operations. The foregoing is desirable so that no unclean water may be retained in the vessel because of becoming pocketed in the spout.

With the foregoing essential features in mind, my invention includes other detail features of construction that will appear more fully in the following specification, and which are completely shown in preferred and modified embodiments in the accompanying drawing, in which:

Figure 1 is a side view of a vessel or teapot equipped with a protector embodying my invention, the top and bottom portions of the pot being broken away and shown in section to illustrate the filling opening of the pot and the cover applied thereto, and to illustrate the bottom structure that provides the receiving pocket or recess for the protector when it is not mounted upon the spout itself.

Figure 2 is an enlarged view showing the spout portion of the teapot illustrated in section along with the protector applied thereto.

Figure 3 is a sectional view of the protector of the present invention.

Figure 4 is a cross sectional view on the line 4—4 of Figure 3.

Figure 5 is a view similar to Figure 3, but showing a modification of the protector construction.

Figure 6 illustrates a further modification.

Figure 7 is a detail side view partly broken away, showing a modified form of the cleaning projection with which the protector may be equipped interiorly thereof.

Referring to the drawing, in Figure 1 there is illustrated a vessel or teapot, which, in general structure, is somewhat conventional in that it is similar to those commonly in use in restaurants, dining rooms, tearooms, or the like. The pot construction has been redesigned for the purposes of the invention, however, as to its bottom formation as will be later more fully pointed out, and also in respect to the covered opening at the top.

The body of the pot is designated 1, its spout is denoted 2, the handle is denoted 3, and the removable cover or top at 5. On the spout 2 is mounted the protector 6 and this protector is in the form of the cap illustrated best in Figures 1 to 4, said cap comprising the closed top portion 7 from which extends downwardly a skirt portion 6a, adapted to house the free upper end of the spout 2. From the closed top portion 7, there extends downwardly within the space encompassed by the skirt portion 6a, the cleaning projection 8. This projection 8 is intended to fit snugly in the spout extremity in contact with the inner walls of the latter, and is dimensioned accordingly for such purpose.

The length of the projection 8 may be approximately that of the skirt portion 6a. The projection 8 will preferably be formed with a water exit passage 9, longitudinally thereof, and small ducts 10, lead laterally from the upper end of the passage 9 so that water which may enter the passage will pass laterally outwards therefrom, upon inversion of the pot 1, equipped with the protector 6.

Such water may escape from the protector through small openings 11 in the uppermost portion of the wall structure of the skirt 6a, these openings being best seen in Figure 1.

Now it is contemplated that the protector 6 of the invention shall at its top portion 7 project slightly outwardly from the outer surface of the skirt portion 6a so as to facilitate grasping the article in the operations of applying the same and removing it from the spout 2.

I preferably made my protector 6 of rubber, rubber composition, or similar resilient substance that may be suitable for the purpose and which will in no way affect the flavor of the liquid contained in the teapot or vessel. The use of rubber is appropriate because it is resilient, non-breakable, readily applicable and possesses frictional advantages especially in relation to the contact of the projection 8 upon the inner walls of the spout 2, such contact being desirable to afford a wiping function by which tea stains, or other stains, are cleansed from the said inner walls, as an incident to the pulling off or removal of the protector 6 from the spout.

As seen in Figure 1, the bottom 12 of the vessel or teapot is made of special formation. It is shaped much like an inverted cup and provides a pocket or recess 13 on this account, said recess having a hollow tubular projection 14 extending from the innermost portion 12a of the bottom downwardly.

The purpose of the formation of the bottom 12—12a and the tubular projection 14 is to provide an enclosure or receiving part on the pot 1, into which the protector 6 may be entered and retained when it is not mounted upon the spout 2 as heretofore outlined in my statement of my invention.

With the above in view, it is notable that when the protector 6 is arranged in the hollow bottom portion of the pot 1, the skirt 6a is spaced from the projection 14 and the projection 8 is received snugly within the hollow or inside portion of the member 14. In no way will the protector 6 interfere with the ordinary use in handling of the pot 1, when it is mounted in the hollow bottom of said pot. But under such conditions, the protector is very handy to be quickly removed and placed in position on the spout when desired to do so.

In the use of my invention, as above set forth, according to one preferred embodiment of the same, when the teapot 1 is in the kitchen and being handled for purposes of washing and for purposes of filling it with tea, or like liquid, it is contemplated that the protector 6 shall always be applied to the spout 2. It is at these times when most of the chipping of the end of the spout occurs and the liability of such chipping is entirely avoided by the use of the protector under such conditions. If the pot is being washed, the protector 6 must be used upon the spout 2 and in the washing and rinsing operations when the pot 1 is inverted, any superfluous water in the pot and in the spout 2 will drain out through the passage 9, ducts 10 and apertures 11 of the protector.

Now as the waiter serves the tea or other liquid in the pot 1 from the kitchen, he will maintain the protector 6 applied to the spout until he places the pot upon the table ready to serve the customer. At such time before depositing the pot actually upon the table, he will quickly remove the protector 6 and introduce the same into the hollow bottom 12 of the pot. This may be done so that the customer does not even notice that the protector has been used, and of course, the customer will scarcely ever notice that there is a protector mounted in the bottom of the pot, because to all appearances, the top portion 7 of the protector closes the hollow bottom 12 when the protector is disposed in the latter.

After the teapot has been used for the service of the customer, the waiter will collect the pot or pots on the tables, and as soon as he picks up the pot, he will remove the protector from the hollow bottom, and place it in position upon the spout so that as he handles the pot, after removal from the table, the spout extremity will always be covered or protected by the member 6.

From Figures 1 to 4 inclusive, it will be noted that the skirt portion is interiorly formed with longitudinal ribs 15, seen best in Figure 4, which ribs contact with the outer wall of the spout at its extremity. This modified construction may be desirable to somewhat reinforce the connection between the skirt portion of the protector and the spout outer wall section.

In Figure 5, the construction of the protector illustrated is similar to those shown in Figures 2 and 3 except that the openings 11 are dispensed with and the tubular or hollow portion of the projection 8 is formed with a water outlet opening 16 leading directly through the top portion 7 and in communication with the passage 9.

In Figure 6, I have illustrated a construction which is substantially like that in Figure 3, except that the projection 8 is entirely omitted.

In Figure 7, a modification in the form of the projection 8 is employed, the projection here being designated 8a, and being formed with a spiral rib 17 extending around it and running from its inner end to its outer end. In this construction, the body of the projection 8a does not contact with the inner wall of the spout but the outer surface of the spiral rib 17 does, and is adapted to frictionally engage said wall for removing the tea stains.

In this construction of Figure 7 also the suds water or rinse water in the washing operation of the pot will pass to the exit openings 11, not shown, for the protector, by passing through the space between the body of the projection 8a and the inner wall of the spout extremity which space is created by the provision of the rib 17 contacting with such wall.

In the various figures of the drawing, where the parts are alike, the same reference characters are used to designate them.

In Figure 1 I show that the top portion of the pot itself, where the cover 5 is located, is formed with a depending and downwardly tapering cover supporting flange 18. This flange is elongated and does away with the formation of the small rib-like seat ordinarily provided to support the cover of the teapot. Said rib-like seat is a weakness of the construction of teapots, or the like, because it is liable to be chipped also, and therefore, when I provide the flange 18, I do away with said seat that is so easily frangible, and eliminate the liability of chipping at this point in the construction of the vessel.

Having thus described my invention, what I claim as new and desire to secure by Letters Patent of the United States, is:

1. In combination, a teapot provided with the usual spout and formed with a pocket or recess in the body portion thereof, and a protector adapted to receive and mounted upon the spout extremity, said pocket or recess of the pot being formed so as to receive the protector when it is removed from the spout.

2. In combination, a teapot having the usual spout and provided with a hollow bottom projecting inwardly and upwardly from its lowermost portion, and a protector adapted to receive and house the extremity of the spout mounted thereon, the hollow bottom of the pot being formed to receive said protector when it is removed from the spout.

3. In combination, a teapot, formed with a bottom portion extending upwardly thereinto to provide a hollow space affording a pocket or recess, a tubular projection extending downwardly from the innermost portion of said pocket or recess and a protector mounted on the spout extremity so as to receive and house the same and provided with an interior projection adapted to enter the spout opening, said protector when removed from the spout being adapted to be seated in the pocket or recess aforesaid so that its projection enters the hollow projection of said recess.

4. The combination of parts set forth in claim 1, wherein the protector is formed with openings leading from the interior thereof to the outer surface thereof for escape of water, or the like, from the spout through the protector.

5. The combination of parts set forth in claim 3, wherein the protector is provided with a water exit opening leading through the same, and wherein the projection disposed interiorly of the protector is formed with a water passage in communication with said exit opening.

6. As a new article of manufacture, a protector for the extremities of teapot spouts for preventing chipping thereof, the same comprising a body of rubber, or the like, including a closed top portion, a skirt depending from the top portion to receive the spout while the top portion closes the end of the spout and a projection interiorly of the body extending from the top portion in spaced relation to the skirt portion for entering the opening of the spout to afford a cleaning member.

7. As a new article of manufacture, a protector for the extremities of teapot spouts for preventing chipping thereof, the same comprising a body of rubber, or the like, including a closed top portion, a skirt depending from the top portion to receive the spout while the top portion closes the end of the spout and a projection interiorly of the body extending from the top portion in spaced relation to the skirt portion for entering the opening of the spout to afford a cleaning member, said projection and the skirt portion having water exit means formed therein to permit water entrapped in the spout to pass out of the same through the protector when mounted thereon.

8. As a new article of manufacture, a protector for the extremities of teapot spouts for preventing chipping thereof, the same comprising a body of rubber, or the like, including a closed top portion, a skirt depending from the top portion to receive the spout while the top portion closes the end of the spout and a projection interiorly of the body extending from the top portion in spaced relation to the skirt portion for entering the opening of the spout to afford a cleaning member, said skirt portion being formed with ribs on the inner side thereof to contact with the outer surface of a spout on which the protector is mounted.

ALBERT C. OSTERHELD.